United States Patent
Shettel

[15] 3,693,357
[45] Sept. 26, 1972

[54] IRRIGATION CONTROL

[72] Inventor: Ralph E. Shettel, Rte. 1, Twin Falls, Idaho 83301

[22] Filed: March 21, 1969

[21] Appl. No.: 809,164

[52] U.S. Cl. ...................................................61/29
[51] Int. Cl. .............................................E02b 7/44
[58] Field of Search.................................61/22–29

[56] References Cited

UNITED STATES PATENTS

| | | | |
|---|---|---|---|
| 1,059,834 | 4/1913 | Cheathum | 61/23 |
| 3,300,985 | 1/1967 | Humpherys et al. | 61/25 |
| 3,333,423 | 8/1967 | Cook, Jr. | 61/29 |

*Primary Examiner*—Peter M. Caun

[57] ABSTRACT

A planned system in checking that provides the mechanical means for the automatic diversion of irrigation waters to the field; that progressively reduces the human involvement through practical basic mechanisms and regulator devices; that provides for the incorporation of various mechanical actuators and automatic controls; that anticipates the coming sophistication of remote control as a part of a completely programed auto-interpretative system; that provides the necessary protective considerations for its mechanisms and equipment against the abuses of livestock and related maintenance practices; that eliminates the problem of check manipulation while solving those of pressure head and seal and surge and flooding.

15 Claims, 11 Drawing Figures

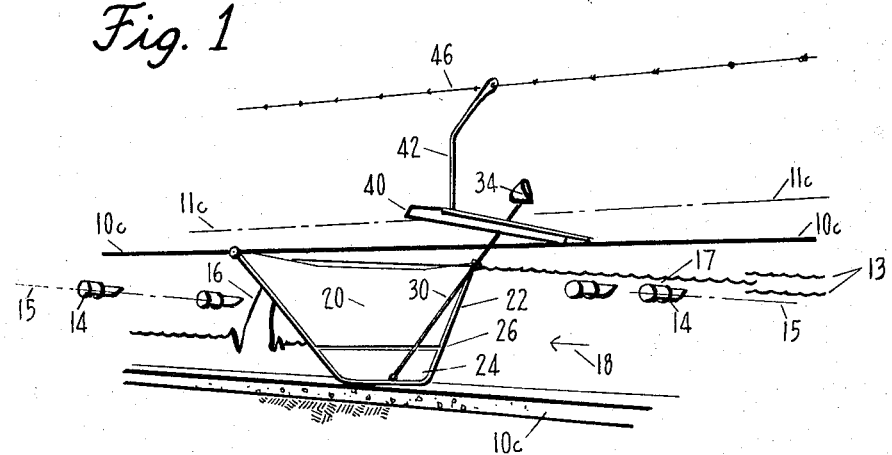
Fig. 1
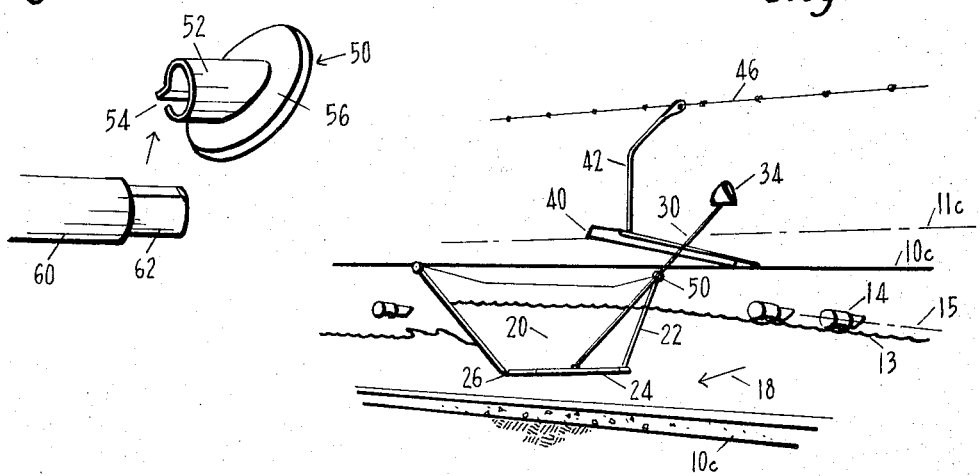
Fig. 4
Fig. 2
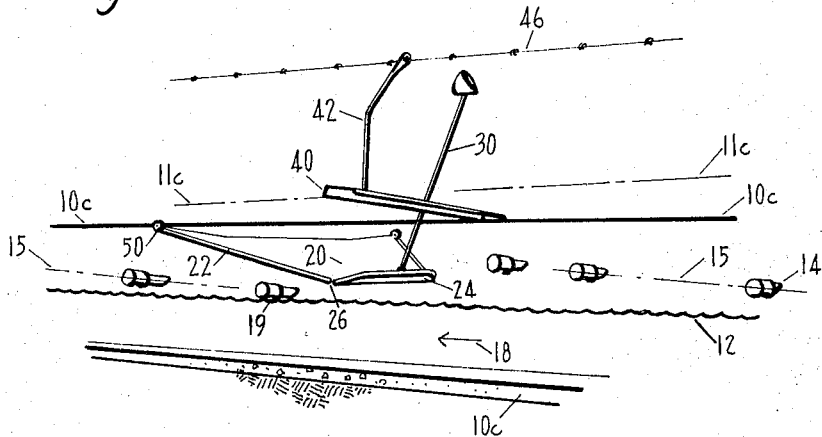
Fig. 3

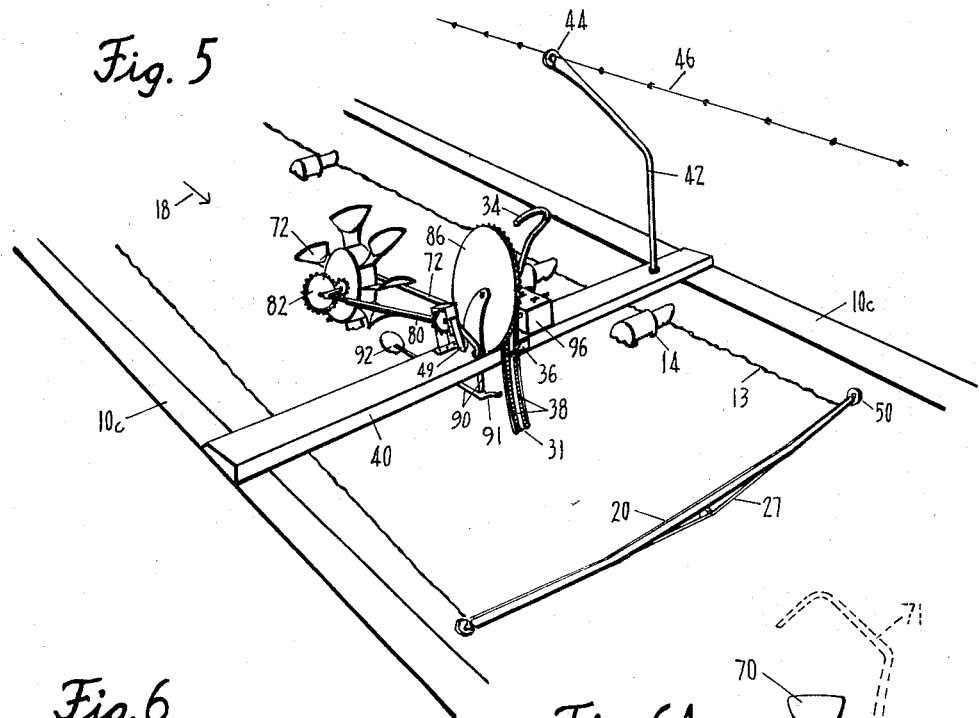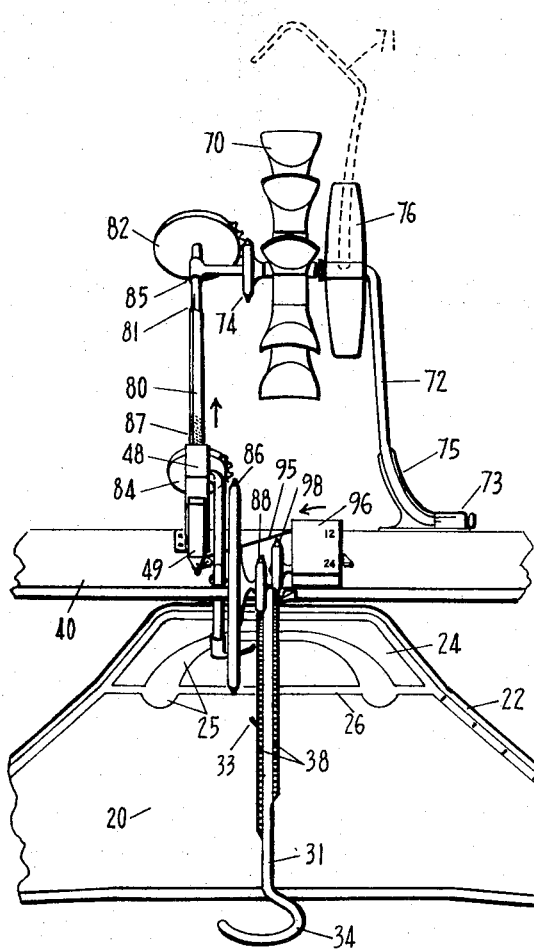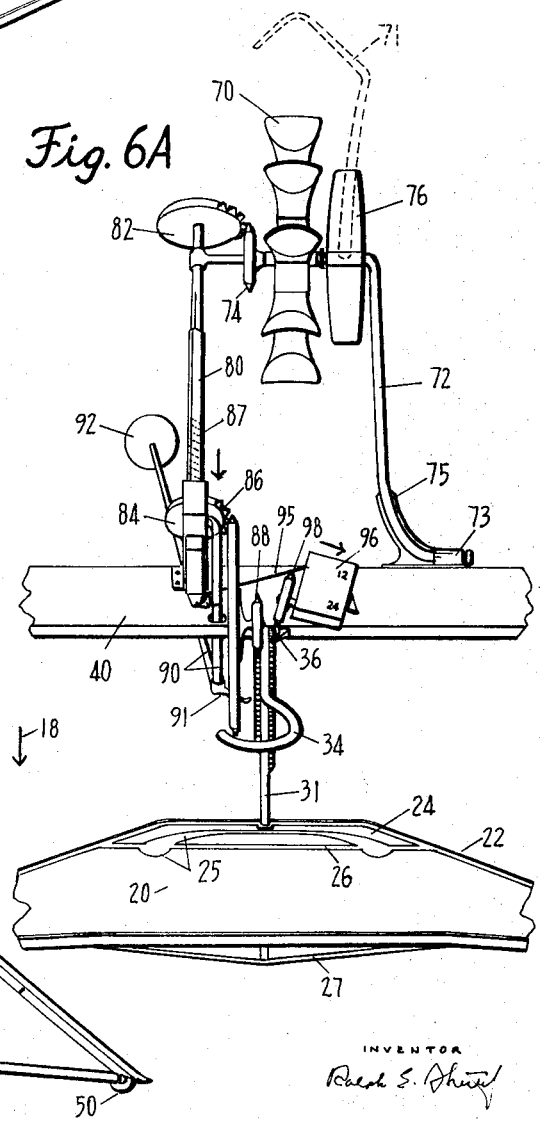

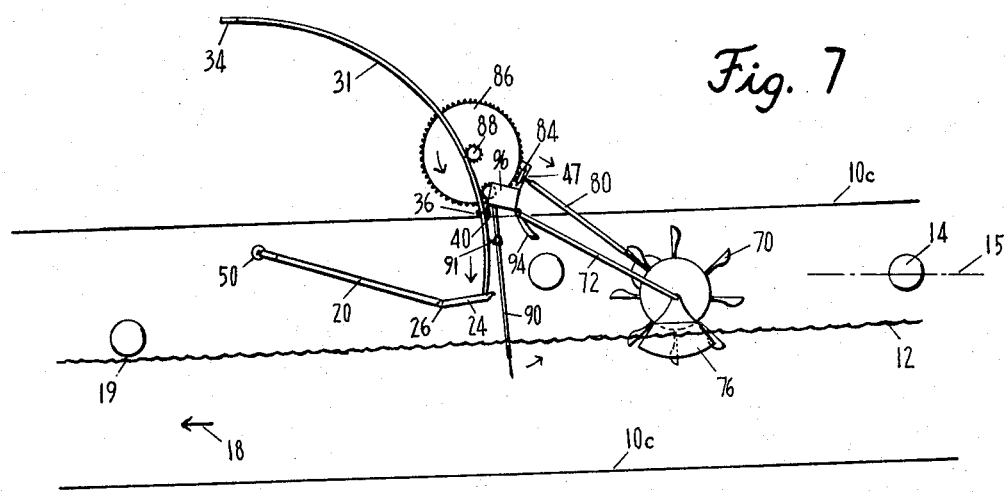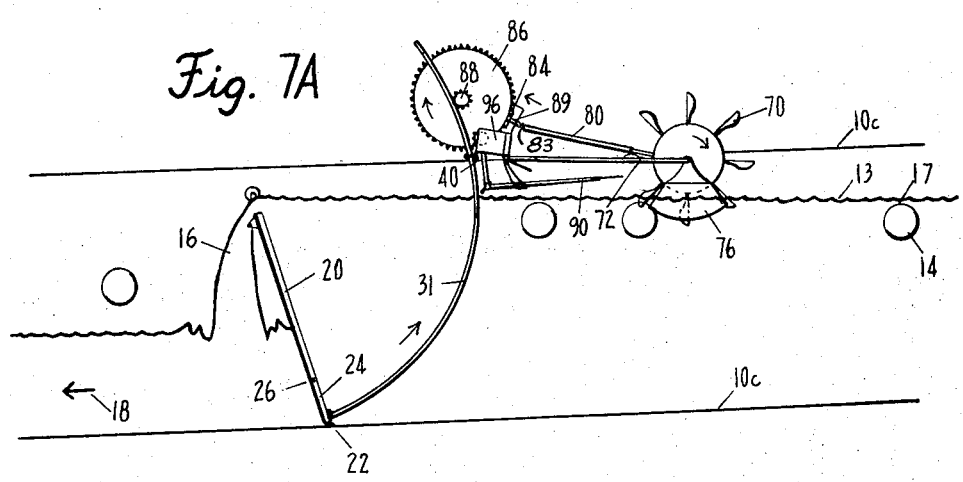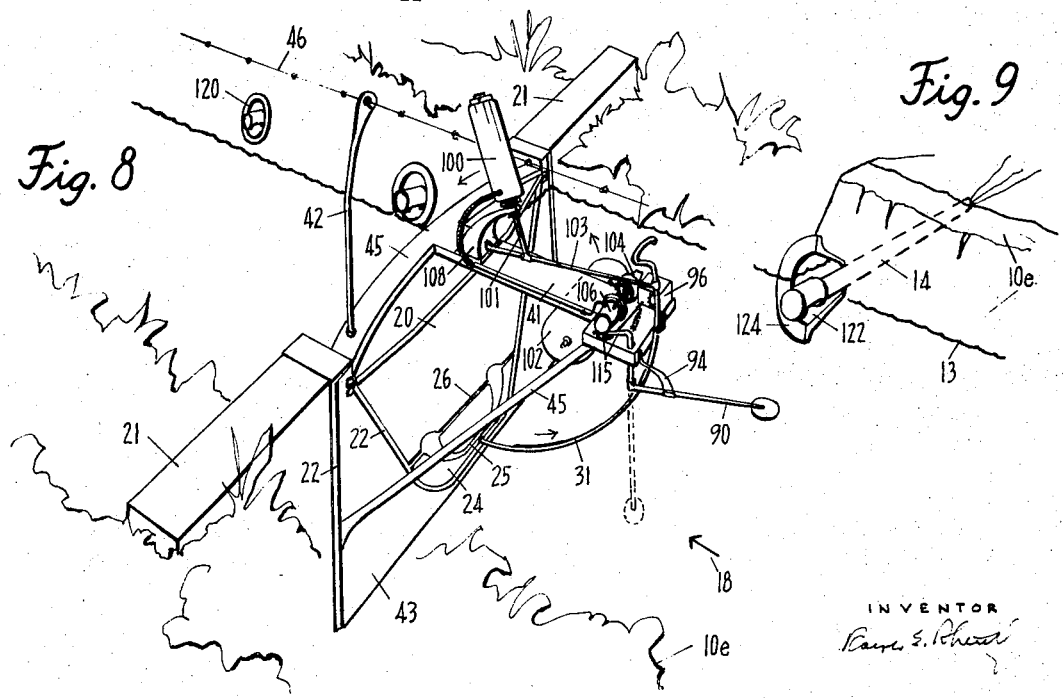

IRRIGATION CONTROL

Any irrigation process is synonymous with water diversion. It is required that waters be broken down, through diversion, into the manageable units that will afford their uniform distribution over farm lands. Though this present invention relates to this process, it is more directly concerned with the sophistication of existing practices through the incorporation of automatic devices and regulators.

Normally, the row crop diversion process for the irrigator involves two basic steps. First, the feed ditch check and cutout which raises and measures waters for diversion from the feed ditch to the head ditch, and second, the head ditch cutout which measures waters for diversion from the head ditch directly into the corrugates. This process requires hours of hand labor in setting and regulation. Much has been done physically for the check that obsoletes the canvas or plastic dam, but the shovel made ditchbank cutout, with all its shortcomings, the human error in balancing and the fickleness of erosion and damming, is only now receiving extensive labor saving considerations. The familiar siphon tube, as one, offers little advantage, however, for its use will always require the hand labor of relocation and starting and water volumes are tied to tube size. While straight tubes alone are an obvious proposal, the variety in water use that well satisfy crop and seasonal demands must be provided through refinements in checking, since more or less water to the corrugates is directly related to the water level at the tube opening. The degree of checking must therefore vary. This anticipation and manipulation requirement puts any automatic diversion mechanism quickly in jeopardy. Rather then, the deligation of all manipulation and variety in water use to ditch valves through the incorporation of adjustable plastic metering valves (reference U.S. Pat. to Shettel No. 3,400,909) into the sidewall of any feed ditch, be it of earth or lined with concrete. Half of the diversion process is immediately eliminated while the check itself is held to the fundamental act of opening and closing, free of the balancing requirements and manipulation labors just described, to thereby insure simplicity for the checking mechanism.

This capability alone now allows the sophistication of the checking operation through the serious consideration of automatic checking. A check that progressively minimizes the degree of manual involvement in the irrigation process is the particular objective of the invention.

Another important objective of the invention is to provide solutions for the adverse problems of check seal in closing and surge in opening.

A further objective of the invention is to progressively automate the operational sequence through the incorporation of mechanical and remote devices that will adapt to variety in location and use.

A still further object of the invention is to improve production efficiency through the realization of reduced labor and improved water use.

Other objects of this present invention will become apparent as the embodiment is hereinafter revealed through the recited specification, and shown with reference to the cooperative drawings, wherein like numerials refer to like parts throughout, and in which:

FIG. 1 is a perspective view of the basic manual pivot check, its mechanism in closed position;

FIG. 2 is a repeated view with the check in "crack" position;

FIG. 3 is a repeated view with the check in open position;

FIG. 4 is an enlarged view of the pivot hinge means;

FIG. 5 is a perspective view of the basic check mechanism featuring paddle wheel actuation;

FIG. 6 is a top plan view thereof, closing initiated;

FIG. 6A is a repeated view, opening initiated;

FIG. 7 is an operational side view thereof, closing initiated;

FIG. 7A is a repeated view, opening initiated;

FIG. 8 is a perspective view of the basic check mechanism adapted to a typical concrete structure, common to the conventional earth ditch, featuring cylinder actuation; and FIG. 9 is a sectional detail of the metering valve protector.

With reference to the drawings and FIGS. 1, 2 and 3 in particular, a basic manually operated check mechanism is functionally depicted within the walls of a concrete lined ditch 10c. The near wall 11c has been omitted for the sake of clarity. The water current for the ditch is typically represented by arrow 18. The primary duty of dam 20 is to raise the water level within the ditch. In the checking procedure, passing waters 12 (FIG. 3) are raised to level 13 (FIG. 1) to cover the ditch valves 14, equally spaced and aligned level along the ditch wall. It should be obvious that the corrugates receiving the water lie beyond in the view depicted. The positioning of dam 20 in ditch 10c must allow for spill 16 in the closed position and provide for its suspension above the passing waters in the open position. It is also desirable that the line of valves 15, of FIG. 3, behind any one dam be positioned so the lowest valve clears the passing waters as shown at 19 to thereby eliminate the nuisance of between irrigation dribble and, more importantly, the need for disturbing valve 'preset', since this will unnecessarily multiply hand labor which is self defeating, There is efficiency in simplicity and dam 20 operates simply through two positions, open and closed, irregardless of position in the set. The valves 14 are set to be equally submerged below a minimal checked water line from the top of dam 20. This provides each valve with a related pressure head 17, FIG. 1, whatever the water level 13 that will produce valve identity. For the sake of simplicity again, the valves 14 are "preset" so that, as the check is made, the waters are automatically and uniformly metered to the field. Excess waters are spilled as at 16 into the succeeding check for diversion and so on until the set is completed. All the ever changing variety inherent with any irrigation process is manifest in the last check and is responsive to grade of ditch or frequency of checking, particular crop and seasonal demands or valve "preset", human error and so on. How the irrigator chooses to reconcile this variable will depend pretty much on conditions in the field, as it always has.

Dam 20 is lightweight and can be of aluminum alloy and plastic or thin wall steel tubing and galvanized iron with pivots 50, of FIG. 2, provided to the top extremities thereof disposed to locate it in ditch 10c. The pivot arch 52 is seen in FIG. 4 as a cutaway 54 which will receive the lesser swiped surface 62 of pin 60 and, after rotation, become engaged therein. Suitably attached thereto, flange 56 is angled to match normal ditch sidewall taper and symmetrically punched to receive the shank portion of a hard nail, which is punch driven through the arch portion to provide the required anchorage. Cutaway 54 is orientated out of the arc of travel normal for dam 20, or pin 60 is passed with dam 20 out of position and through downswing finds permanent location. Conversely, it is thereby removable for easy maintenance and replacement.

The suitably reinforced edge of dam 20 common with ditch 10c is seen to have a continuous and laterally adjustable vinyl seal 22, FIG. 1, which serves to anticipate the minor variations of surface and shape found in most ditch liners. A substantial lower portion forms a limited upward acting segment panel 24 disposed to "crack" the check preparatory to a full opening, as seen in FIG. 2. The resulting controlled release of the accumulated head eliminates the threat and violence of surge and flooding and accordingly maintains the ditch floor for future sets. The novelty of segment panel 24 is further manifest in significantly reducing the initial surface area to be acted upon for an opening. Pressure seal is thereby substantially reduced and is prerequisite to automatic actuation. Segment panel 24 is suitably attached to dam 20 through a continuous hinge means 26 of waterproof webbing, and this will hereinafter more fully be described. A symmetrically located flexible attachment, set apart from its lower edge, is provided to receive and locate a controlling chain means or, preferably, one extremity of control rod 30. The opposite extremity is shaped into handle 34 for manual operation. Span 40, which can be an aluminum alloy or steel channel, is located on ditch 10c rearwardly apart from dam 20 and serves to support and suitably locate control rod 30, and thereby selectively position dam 20 for sequence of operation. Extending upright from its anchorage on span 40 apart from either ditch wall, anchor post 42 is seen in FIG. 2 to turn inwardly and end with an insulated loop 44 which will receive and support, centrally, a ditch aligned electrical fencing wire 46. Since most farm lands are used for fall pasture, this fencing provision protects the entire system from the abuses of cattle and the like. Where checks are spaced far apart, a span and anchor post unit alone will serve to continue the fenceline. All rods, as such, are preferably fabricated from alloy tubing.

To sumerize the manual involvement for this irrigation operation, from the open position of FIG. 3, a set of checks is manually dropped closed, FIG. 1. The water raises to cover the "preset" valves for automatic distribution, individually for row crops or working together for border type irrigation practices. To change the set, the manual closing of additional checks is progressed down the line. All working checks are then manually "cracked", FIG. 2, with the accumulated waters in controlled release, with the sequence ending when all "cracked" checks are manually returned to the open position, of FIG. 3, for storage. The system is foolproof and farmers and ranchers are presented with the alternatives of making the irrigation work fit in after the daylight hours or its deligation as a family chore to thereby reduce or eliminate those expenses commensurate with the hiring of an irrigator.

The basic function of panel 24 is to so reduce the initial opening load that realistic actuators and other related devices can develop toward complete automation. The release of accumulated water dissipates excessive water pressure and seal to thereby relate the work load for the opening actuation of dam 20. During the irrigation process, panel 24, in balancing the diversion, counters variety in ditch volumes while selectively reproducing valve pressure head 17.

Ditch screens, although not required, will surely improve the efficiency of this irrigation process, especially in those areas of excessive mossing. Since the metering valves herein described are submerged, wind blown debris is of little concern.

Waters are accumulating behind dam 20, as shown in FIG. 5, and a paddle wheel actuator is depicted mounted to the basic check mechanism just described. It has been modified, however, to the extent that span 40 is positioned to face the arc of swing exercised by dam 20. Similarly, control rod 30, with its depending rack portions 38, is formed in curving alignment therewith to thereby maintain frictional travel within the roller guide means 36 copending the face portion of span 40, including a provision for the selective displacement thereof in releasing control rod 31 for manual operation. Briefly, this adaptation of the invention comprises an arrangement of gears in communication with driveshaft 80 which, in mechanical advantage, transmit and magnify work between paddle wheel 70 and control rod 31 for the raising of dam 20, and thereby further the automation of this irrigation process. One extremity of ditch aligned paddle wheel supporting arm 72 is seen in FIG. 6 to be pivotally attached at 73 to span 40 and therewith provide suitable anchorage for aligned stop 75. Its rearward extremity is laterally turned inward to provide the axle means for the mounting and alignment of paddle wheel 70 and its attached pinion drive gear 74. All gears are preferably cogged or spurred as self cleaning. Float 76, suitably attached thereto, apart from the axle means, is self leveling and disposed to bouy paddle wheel 70 to the changing waterline while maintaining an effective operating depth for the paddles. Under certain conditions, a trash guard 71 may prove helpful and can exist as a curbing element depending rearwardly from supporting arm 72 and curving down to the waterline. Driveshaft 80, in parallel alignment and interconnecting between affixed gears 82 and 84, is spring loaded 87 as a slipshaft 81 with the added flexibility of universal drive 83, of FIG. 7A. Driveshaft 80 finds suitable pivotal support 85 out of the axle portion of supporting arm 72 to thereby mesh gear 82 with drive gear 74. The action of spring loaded shaft 87 is provided, at the proper time, to force the mesh of gear 84 with gear 86 which is seen to have its attached pinion drive gear 88. Since the point of pivot for driveshaft 80 is above that for supporting arm 72, FIG. 7, the compression of spring 87, within, is increased toward high water. This is timed to enhance the work and sequencing as will be later shown. Gears 84, 86 and 88 are suitably bracketed 48 together for their support and mesh and affixed to span 40 with driveshaft 80 retaining selective and limited longitudinal travel 89, of FIG. 7A, in its mounting behind gear 84 and over a stud portion, which is aligned therein but depending rearwardly from the forward adjoining surface of bracket 48. Gear 88 is permanently meshed with its appropriate rack 38 while the proximity of control rod 31 is maintained through the guide means 36, fore and aft, as before described.

To activate the closing sequence, trip 90 is manually lowered and acted upon by the passing waters 18. It is seen in FIG. 7 to have a lower arm extending laterally down from suitable pivotal attachment to span 40, and ending with a blade extremity 92 disposed to impart thrust, conversely, to an opposing arm that extends up, through a perforation in span 40, and curves back to finally laterally engage driveshaft 80, and thereby cause a rearward shift to gear 84 for the disengagement of the drive mechanism, while locking paddle wheel 70 inoperative through gear to bracket keying 47, while overcoming spring 87. Since the position of paddle wheel 70 is low, spring 87 is relaxed and easily overcome. Rocker plate 49, which faces the forward surface of bracket 48, FIGS. 6 and 6A, and pivotally depending therefrom, has suitable connections with the shaft engaging portion of trip 90 at its upper extremity, with linkage 95 depending from its lower extremity. Simpathetic thrust is thereby passed along to initiate a pivot to the mounting of timer 96 and thereby mesh winding gear 98 with its appropriate rack 38. Timer 96 is dogged to maintain this linkage relationship throughout the closing sequence. This disengagement of the drive mechanism releases dam 20 to fall by gravity and be caught by the passing waters 18 and forcefully closed, while the downtravel of rack 38 winds timer 96, while a depending lobe portion 33 impacts the stricker portion 91 of trip 90 to flip it upward past pawled keeper 94 and therein become caught for storage. As water rises behind dam 20, float 76 lifts paddle wheel 70 with it, though made inoperative by the before described keying action. A seal is accomplished as segment panel 24 is pressed by the building water head to overcome pressure equalizing clip 25 depending from suitable reinforcements, along the hinge means 26, that substantially resists the seal thereof. The closing sequence is completed.

Certainly those skilled in the art will readily see that a next logical automation step is the substitution of the mechanical trip means 90 with a remote control package. With this will come the master auto-interpretative sequencing system that oversees the entire irrigation process. As this sophistication develops, attention is directed to the automation that is just now possible.

Timer 96, of FIG. 6, is adjustable and will tick away 12 or 24 hours before the opening sequence in initiated. At that time, the timer dog releases linkage 95 to reverse itself through the action of spring 87. Winding gear 98 is disengaged through the converse pivot of timer 96, FIG. 6A. Gear 84 is driven forward to mesh with gear 86 and thereby actuate the drive mechanism, through the release of paddle wheel 70 for rotation that is pawled for the raising of dam 20. What seal remains against segment panel 24 is overcome and initial "crack" is accomplished with the dissipation of accumulated waters in controlled release. The operation of paddle wheel 70 is responsive to water current 18 and this too is sympathetic to the problem of surge and flooding because of its slower initial action. As the pressure head against dam 20 is eased by the receding waterline, paddle wheel 70, in full operation, floats down with it and the raising of dam 20 is accomplished. Finally, supporting arm 72 engages stop 75 and all activity ceases when lobe 33 impacts span 40. As a second choice, stop 75 could be positioned to suspend paddle wheel 70 just above the passing waters for storage, to thereby stop all action. Dam 20 is in position above the passing waters for storage with drive gear 88 acting as a hold open while the mechanism is held inoperative. The opening sequence is completed.

An alternative actuator is depicted in FIG. 8 as an adaptation to the existing in the way of ditch structures. It is necessary that the basic check mechanism have the flexibility that allows its application to any of the existing for is is a major concern. This means much variety in the way of checks physically 21 and, necessarily, the conventional ditch of earth 10e. Dam 20 is standardized through its use as a suitably sealed overlay incorporating the required baffling 43. The supporting structures 45 and necessary attachments are directed toward the creation of a type longitudinal platform 41, whose substantially enlarged rearward extremity faces the arc of swing described for control rod 31. The paddle wheel actuator would have been mounted to that end portion with control rod 31 operating through a suitable perforation provided therein. The air ram actuator shown in the view has a sequence of operation which is essentially a repeat of the fully described operation cycle for the paddle wheel actuator, in considered minor modification, as will be herein revealed. Suitably and compactly mounted to platform 41 are an accumulator 102, as a type rechargable pressure cylinder of seasonal capacity, a pressure regulator 104 and a directional valve 106, all plumbed with cylinder 100 though set rearward and substantially apart therefrom.

Cylinder 100 is reverse acting and orificed, or valved, for slow operation. Its position is elevated by an aligned mounting portion 108 in consideration for the actuation thereof and has limited pivotal attachments thereto that permit it to maintain its alignments with piston 101 during actuation while partially counterbalancing the action. The pull of piston 101 is magnified to control rod 31 through a platform aligned lever arm 103, which is affixed thereto apart from its point of pivot in mounting 108. Lever arm 103 extends rearwardly to pivotally engage control rod 31 and thereby produce an arc of swing coincident thereto. Cycle initiation differs from that for the paddle wheel actuator only in that, for the closing sequence, and thrust of trip 90 acts along linkage 115 to activate valve 106 for the release of piston 101 which thereby frees dam 20 to drop closed. For the opening sequence, linkage 115 is reversed to thereby activate valve 106 for the pressurization of cylinder 100 and the slow raising of dam 20, with piston 101 serving as a hold open while the mechanism is held inoperative.

The adaptation of the cylinder actuator to span 40, of FIG. 3, is accomplished through the operational alignment of lever arm 103 over and with span 40, and to the mean of lateral drift exercised by control rod 31, which is straight. The top surface of span 40 provides the required tilt while control rod 31 operates through a suitable elongated perforation centered therein. However, the operation of cylinder 100 is modified in that anchor post 42 replaces mounting 108 with lever arm 103 assuming an elevated point of pivot thereon that is centered between the cycle extremes allowed control rod 31. Cylinder 100 is vertically aligned thereunder with piston 101 pivotally engaging lever arm 103 apart from anchor post 42. Piston 101 is single acting and, though the pressurization of cylinder 100, levers control rod 31 upwards for the raising of dam 20.

Since ditch 10e is of earth, the projecting metering valves 14 are vulnerable and deserve special consideration for their protection against the proximity of vegetative growth; protection against dislocation that disrupts the required valve identity; and protection against injury that can be normally expected with field conditions. Many installations will be made where use of fence line 46 is not possible in preference to the incorporation of valve guard 120, of FIG. 8. They can be of concrete and are seen to have a cup recess portion 122, FIG. 9, into which the valve metering cap is pushed for shutoff or storage. Any projection is thereby eliminated and ditch maintenance is conditionally allowed. A collar portion 124 is provided to increase the separation from vegetative growth while providing the bulk that imparts permanence in location. It will be noted that collar 124 has slant to better conform to ditch sidewall slope. However, good farming practices should include good ditch maintenance and upkeep, for the excesses in trash, fire, abuse and silting, in any case, cannot be tolerated by the equipment and devices herein described and shown.

It should by now be obvious that various modifications and adaptations to the structures will become apparent under the critique of extensive development and manufacture without departing from the spirit and scope of the invention as herein described and shown, for the incorporation and feasibility of motors with worm gears, hydraulics and solenoids toward alternative actuation, activation and remote control have yet to be fully explored, and this invention is therefore not intended to be limited to the specific examples shown and described.

What is claimed is:

1. A check mechanism for an open irrigation channel means for the regulation of water comprising;
   a dam means located within the walls of said channel having a laterally adjustable seal means depending from the perimeter thereof for selective bearing against said channel in the closed position,
   pivot means within said channel permitting the selective installation and removal of said dam, said pivot means comprising a pin means cooperating with a cut-away arch means,
   a span means interconnecting said channel walls disposed apart from said dam for the support of a control means effecting the actuation and positioning of said dam, said dam comprising upper and lower panel portions hinged together located in said channel, said lower panel being disposed as a first opening means reducing pressure and initially overcoming the seal for an opening while serving to balance a division of water and control the release of accumulated water.

2. The check mechanism of claim 1 wherein said lower panel includes a depending pressure equalizing means cooperating with said upper panel to resist a closing by water pressure to thereby further reduce pressure and seal initially overcome for an opening.

3. The check mechanism of claim 1 being further defined by a fence post means depending uprightly from said span with the free end of said post means selectively receiving and supporting a fence line over said channel for the protection of said mechanisms and equipment.

4. The check mechanism of claim 1 with said control being a rod and depending rack means having one end attached to said dam, and the opposite end constituting a handle for the manual operation thereof and located at one intermediate position of selective engagement with said span.

5. The check mechanism of claim 4 with said control having an intermediate curving configuration like the arc of swing exercised by said dam to thereby perpetuate a position of engagement with said span.

6. The check mechanism of claim 4 with said control cooperating with a paddle wheel actuator means comprising;
   a mobile support arm depending from said span having an axle extremity means receiving and alining a paddle wheel and drive gear means,
   a float means depending from said axle to thereby buoy said paddle wheel,
   mobile driveshaft means interconnecting extremity gear means in mechanical advantage disposed in mesh with said drive gear and with opposite extremity span support means permitting limited longitudinal movement of said driveshaft,
   gear cluster means having location on said span for the selective mesh of said driveshaft while being in mesh with said control rack for the actuation of said dam.

7. The actuator of claim 6 including a cycle activator means comprising;
   a trip means depending downwardly from said span to engage passing water and thereby power an opposite extremity leverage means initiating driveshaft displacement locking said paddle wheel drive inoperative while freeing said dam to drop closed,
   a timer and gear means measuring irrigation intervals having pivotal location on said span and linkage means engagement with said trip forcing the mesh of said timer gear with said control rack for the winding thereof by the closing of said dam, said timer being dogged to time a reaction through said linkage initiating driveshaft reengagement and timer disengagement while freeing said paddle wheel drive for a rotation powering the actuation of said dam.

8. The check mechanism of claim 1 being adapted to existing ditch and check structure means with said dam having a baffling means extension closing the existing check structure permitting the standardization thereof, and a ditch aligned platform means supported by said check structure having a rearwardly extending extremity disposed for the support of said control.

9. The check mechanism of claim 8 with said control cooperating with an air ram actuator means comprising;
   a cylinder placed on said platform with an accumulator, a pressure regulator and a directional valve all plumbed in related location, said accumulator being rechargeable, mounting means laterally elevating said cylinder to accommodate the action of its piston while permitting limited pivotal movement, a lever arm means pivotly interconnecting said mounting and said control in mechanical advantage, said cylinder piston being affixed thereto apart from said mounting to thereby magnify the action to said control powering the actuation of said dam.

10. The activator of claim 7 with said trip being adapted to lever said directional valve for the closing of said dam, said timer reacting through said linkage to activate said directional valve for the pressurization of said cylinder.

11. The check mechanism of claim 1 with said control being a ram actuator means comprising;

a cylinder pivotly mounting said span disposed uprightly with piston attachment means permitting the actuation of said dam, said cylinder being valved for speed control, a directional valve, pressure regulator and accumulator in related location on said span being plumbed to said cylinder, a timer means positioned on said span to activate said directional valve through linkage means engagement therebetween for the cycling of said cylinder.

12. The check mechanism of claim 3 with said fence line for the protection of said irrigation mechanisms and equipment being extended through the incorporation of a ditch valve guard means for earth ditch installations comprising;

a cup recess portion into which a ditch valve means is pushed to eliminate projection, a depending coller portion in combination therewith imparting permanence in location while providing said valve separation from vegetative growth.

13. The check mechanism of claim 1 with said control being a rod and depending worm rack means having one end attached to said dam and the opposite end constituting a handle for manual operation, said worm rack cooperating with a motor and worm gear means disposed on said span for the actuation of said dam.

14. The check mechanism of claim 13 being further defined by a solenoid activator means disposed on said span for the cycling of said motor.

15. The check mechanism of claim 11 with said air ram actuator means being a hydraulic actuator means.

* * * * *